(No Model.)
H. O. STANLEY.
ARTIFICIAL MINNOW.
No. 552,012. Patented Dec. 24, 1895.
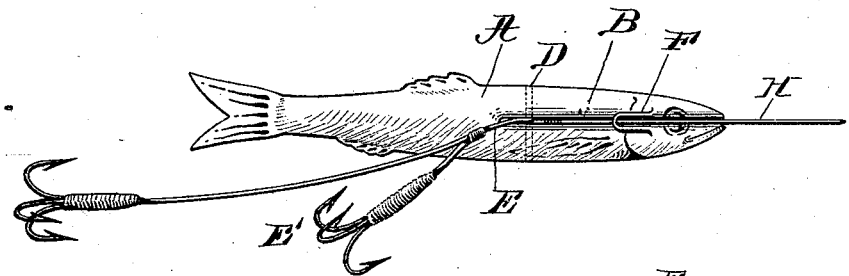
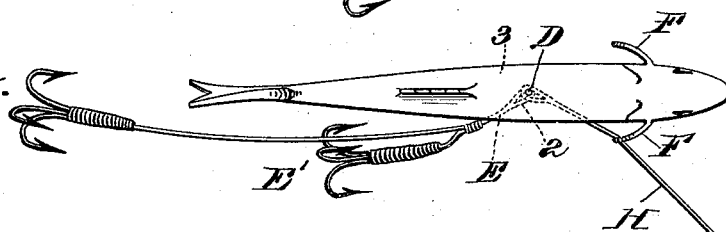
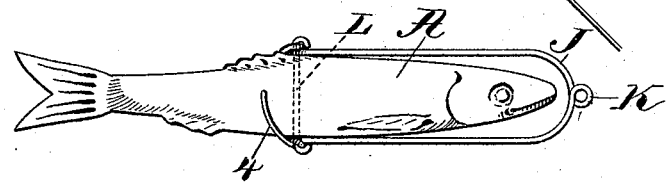
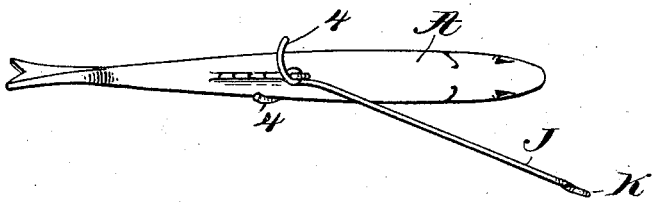
Witnesses.
Arthur L. Randall.
Robert Wallace.
Inventor.
Henry O. Stanley.
by Macleod Calver & Randall
his attorneys.

UNITED STATES PATENT OFFICE.

HENRY O. STANLEY, OF DIXFIELD, MAINE, ASSIGNOR OF ONE-HALF TO L. DANA CHAPMAN, OF BROOKLINE, MASSACHUSETTS.

ARTIFICIAL MINNOW.

SPECIFICATION forming part of Letters Patent No. 552,012, dated December 24, 1895.

Application filed April 10, 1895. Serial No. 545,136. (No model.)

*To all whom it may concern:*

Be it known that I, HENRY O. STANLEY, a citizen of the United States, residing at Dixfield, in the county of Oxford and State of Maine, have invented certain new and useful Improvements in Artificial Minnows, of which the following is a specification, reference being had therein to the accompanying drawings.

My invention has for its object to provide an artificial minnow bait of such form and appearance and so mounted or attached to the line as to resemble in appearance and action a live minnow bait more closely than other devices of the class which have been produced heretofore.

My invention consists in an artificial minnow constructed and arranged as hereinafter more fully set forth.

In the claims at the end of the specification I have particularly pointed out and clearly defined the novel features of my invention.

In the following description reference is made to the accompanying drawings, which show my invention in the best forms now known to me, and in which—

Figure 1 is a side elevation of an artificial minnow embodying my invention, a portion of the trolling-line being shown, as also a gang of hooks in position. Fig. 2 is a plan view of the device shown in Fig. 1, the portions of the line-leader and hook-leader which are adjacent the point of attachment to the minnow being indicated in dotted lines. Figs. 3 and 4 are respectively a side elevation and a plan view showing a second form of my invention.

The minnow proper is shown at A and is modeled after a live specimen of the kind which would be employed for bait if a live specimen were used. It may, therefore, vary in accordance with locality and conditions of use. The minnow is formed preferably of aluminum, although any suitable material may be employed. I prefer aluminum because of its color, weight and practical non-corrodibility. The minnow is formed preferably integral, the tail preferably being slightly twisted, as shown clearly in Figs. 2 and 4, so that as the minnow is drawn through the water it will be caused to turn over or rotate on a line lengthwise thereof.

In the form of invention which is represented in Figs. 1 and 2 the head and forward portion of the body of the minnow have formed therein, about mid-width thereof, a transverse slot or opening B, which extends longitudinally from the nose to a point about midway of the length of the minnow. At or near the inner end of this opening a vertical pin D is passed through the body of the minnow, this pin D serving as a means for securing the leader E of the gang of hooks E' to the minnow, as also for securing the end of the snood or line-leader H thereto. The said leaders are each looped, as shown at 2, and the pin D is passed through the loops, or the leaders may be tied or otherwise secured to said pin in the slot or opening B. The gang of hooks E may be of well-known form or arrangement, and the leader H by which attachment is made to the line may also be of any well-known material, or the end of the line itself may be secured to the pin D. At each side of the head of the minnow I secure a guide or check loop F which preferably is formed of wire, and is secured firmly to the side of the head of the minnow by solder or other well-known securing means. The leader or line H passes inside the loops F, as shown in Figs. 1 and 2, and the said loops serve to prevent the minnow from assuming a position at more than a given angle to the line while it is being drawn through the water. The effect of this construction is to cause the minnow to traverse a zigzag course as it is drawn through the water—that is, it will dart from side to side, moving forward in one line until it has been caused to turn over, when it will dart off in a direction at an angle to that taken by it before it turns over. It will thus travel a zigzag course, by a series of darts from side to side, in close resemblance to the action of a live minnow when used as bait in trolling.

In order to prevent the leaders H and E from being frayed or cut, the edges of the slot B are rounded slightly and made smooth by the use of a file or in any other well-known manner. The inner end of the slot is also inclined or beveled from the center of the minnow to each side thereof, as shown at 3, Fig. 2. This obviates the formation of a sharp corner which would cut or injure the leader of the gang of hooks, and also permits the gang of hooks to assume a position more nearly in line with the longitudinal axis of the minnow, which is desirable.

In the modification shown in Figs. 3 and 4, instead of forming the minnow with a slot, as above described, and connecting the flexible leader with a pin or fastening device at the inner end of the slot, I employ a yoke J, which is provided with an eye K, by means of which the line or leader may be attached thereto. The yoke is pivotally secured at its inner end to a pin L, which is preferably placed and secured vertically in the minnow about mid-width and mid-length thereof, as shown. The yoke J preferably is formed of wire, which is twisted around the upper and lower ends of the pin L, the free ends 4 of the wire being carried or bent downwardly and upwardly in proximity to the sides of the minnow, the said ends serving as checks or stops to prevent the minnow from swinging to either side beyond a certain point relatively to the yoke J.

In the plan view, Fig. 4, the minnow is shown at its extreme of movement relatively to said yoke J, in which position the lower one of the projections 4 is borne against by the side of the minnow and serves to prevent the minnow from swinging farther in that direction. In lieu of the pin L, two projections may be employed, said projections being located in the same positions as are the ends of the said pin L. By this arrangement the minnow is allowed to assume a position at an angle to the line when the bait is being drawn through the water, and thus its darting movement in a zigzag course is insured.

What I claim is—

1. An artificial minnow having its attaching device connected thereto at an intermediate point in its length, having the head portion or forward part thereof capable of swinging to opposite sides of the said attaching device and having also means to restrict the lateral play, substantially as described.

2. An artificial minnow having at an intermediate point in its length a pivotal or swinging connection with its leader or other device for attachment to a line, and free to turn or swing from side to side relatively to the said leader or line-attaching device, and also provided with stops to limit its turning or swinging movement relatively to the leader or other attachment device, subtantially as described.

3. An artificial minnow formed with a transverse opening or slot extending lengthwise thereof, having its leader or line connected thereto in said slot at an intermediate point in the length of the body, and provided with stops to limit the lateral play relatively to the leader, substantially as described.

In testimony whereof I affix my signature in presence of two witnesses.

HENRY O. STANLEY.

Witnesses:
WM. A. MACLEOD,
CHAS. F. RANDALL.